A. B. BAXTER.
PLAYING CARDS.
APPLICATION FILED MAR. 8, 1916.
1,261,473.
Patented Apr. 2, 1918.
3 SHEETS—SHEET 1.
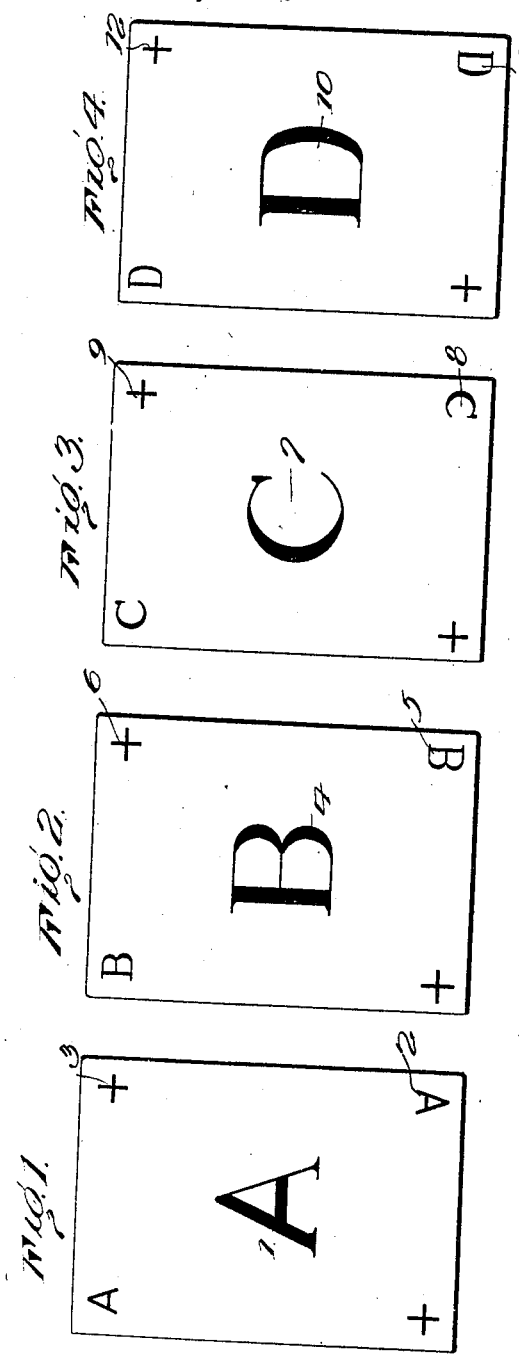
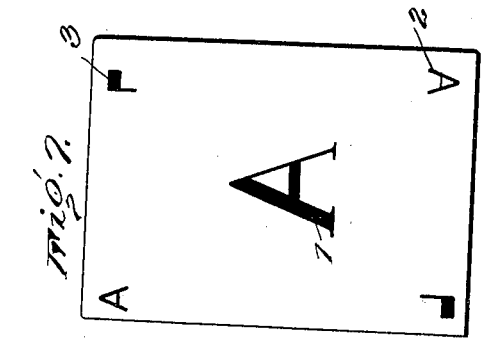
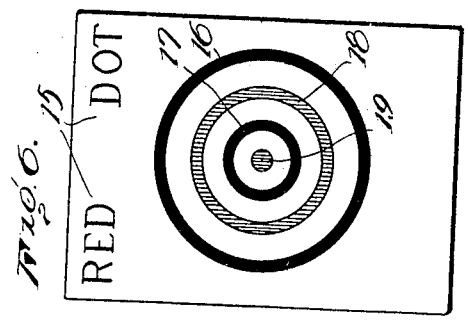
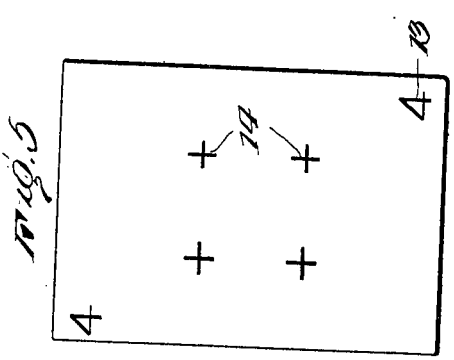
Inventor
A. B. Baxter
By
Attorneys.

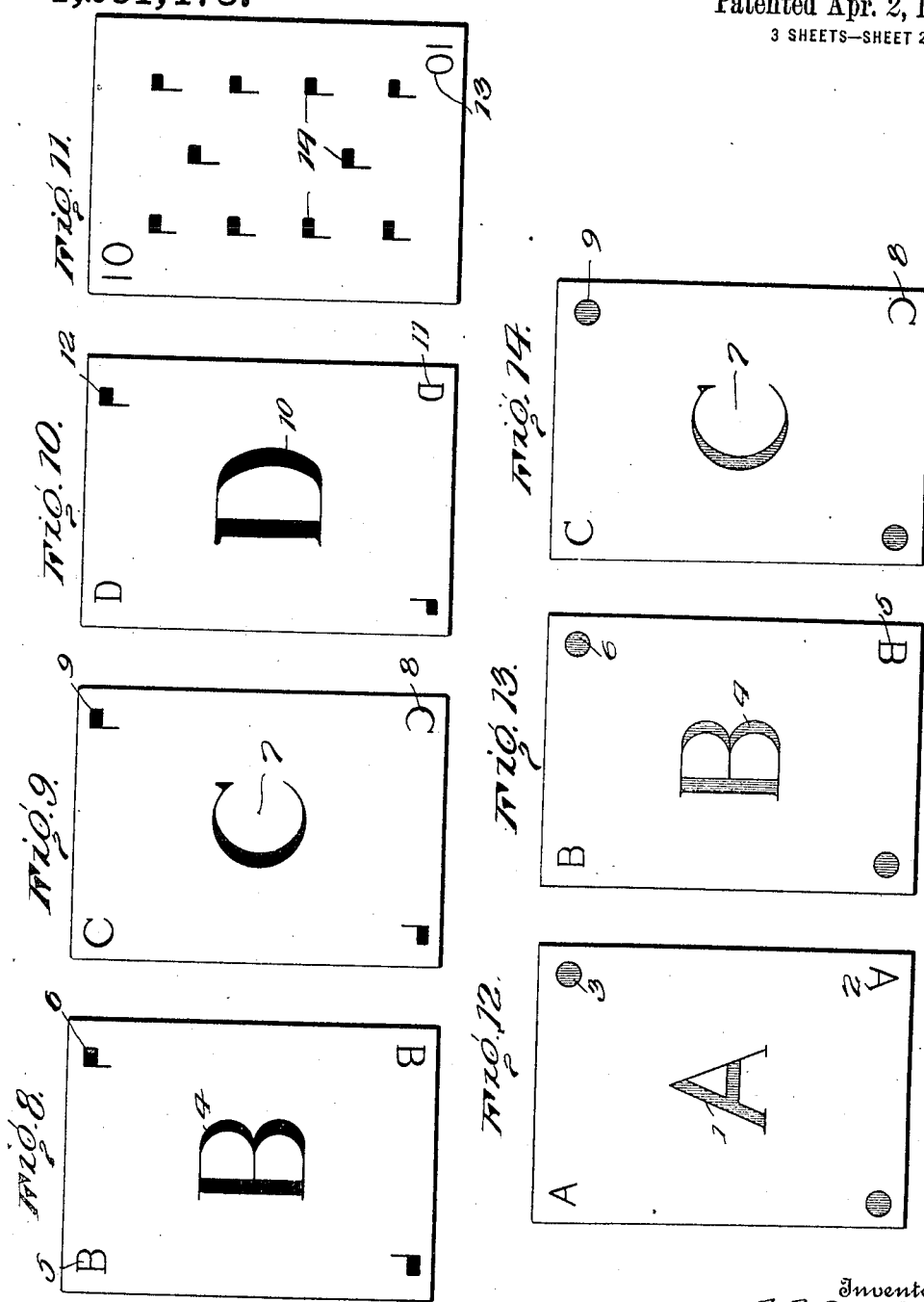

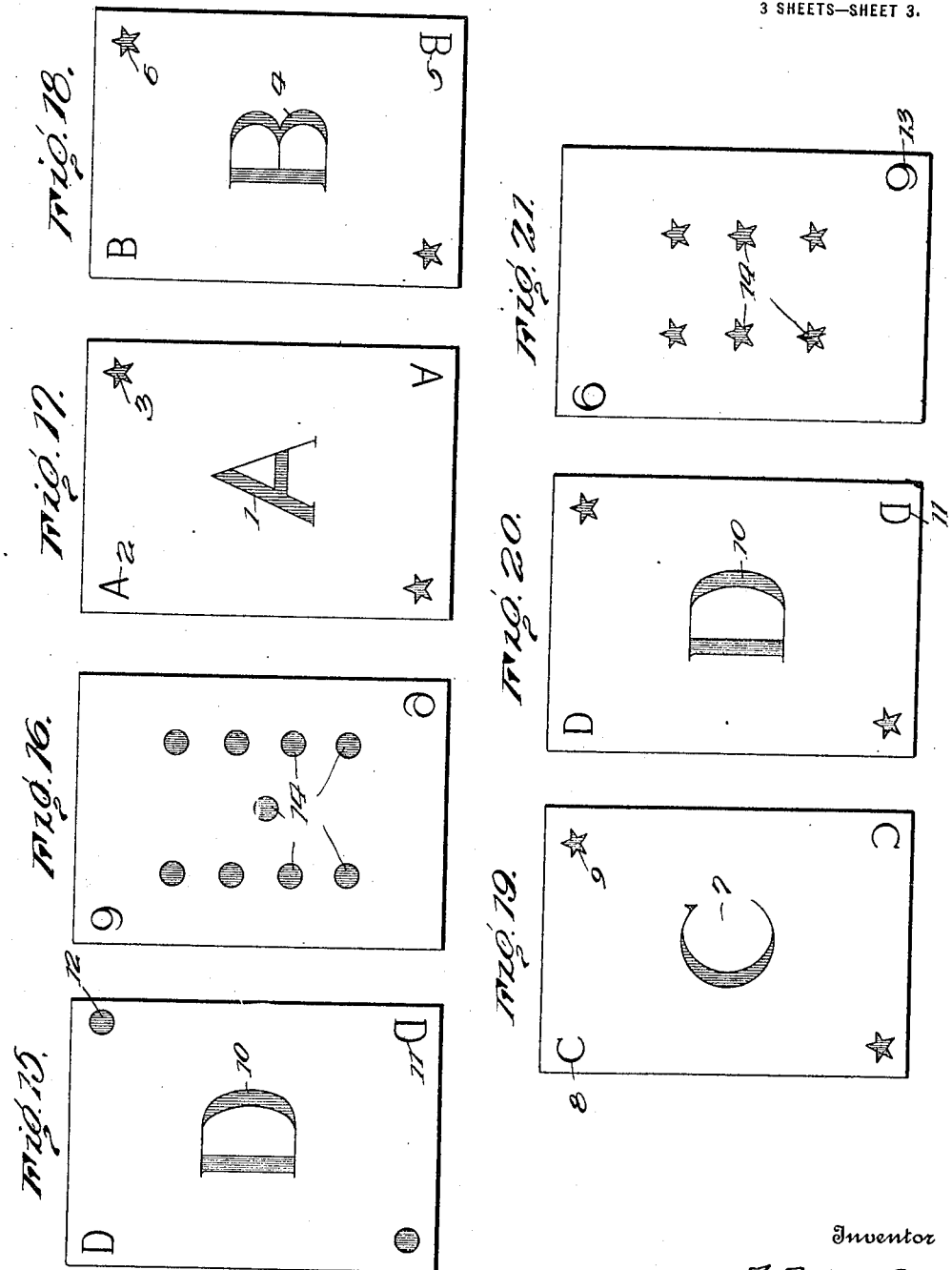

UNITED STATES PATENT OFFICE.

AVERY B. BAXTER, OF FREDERICK, OKLAHOMA.

PLAYING-CARDS.

1,261,473.  Specification of Letters Patent.  Patented Apr. 2, 1918.

Application filed March 8, 1916. Serial No. 82,911.

*To all whom it may concern:*

Be it known that I, AVERY B. BAXTER, a citizen of the United States, residing at Frederick, in the county of Tillman and State of Oklahoma, have invented certain new and useful Improvements in Playing-Cards, of which the following is a specification.

This invention relates to card games and has as its object to provide a set of playing cards with which an interesting and highly amusing game may be played by two or more persons.

A further aim of the invention is to provide a set of playing cards consisting of a number of suits and an additional card which may arbitrarily belong to any suit.

In the accompanying drawings:

Figures 1 to 5 inclusive are plan views of cards representative of one of the suits.

Fig. 6 is a plan view of that card of the pack which may arbitrarily belong to any one of the suits.

Figs. 7 to 11 inclusive are plan views of cards representative of another one of the suits.

Figs. 12 to 16 inclusive are plan views of cards representative of another one of the suits.

Figs. 17 to 21 inclusive are plan views of cards representative of another one of the suits.

Each suit consists of thirteen cards and all of the cards of a suit bear a common symbol. For example, the cards of the suit represented by Figs. 1 to 5 inclusive, bear as a symbol a cross which is preferably printed in black; the cards of the suit represented by Figs. 7 to 11 inclusive bear a symbol which is the representation of a flag printed in black; the cards of the suit represented by Figs. 12 to 16 inclusive bear a symbol which is the representation of a full moon preferably printed in red; and, the cards of the suit represented by Figs. 17 to 21 inclusive bear a symbol which is a representation of a star printed in red.

One of the cards of each suit has printed upon its face and preferably at its center, the letter A as indicated by the numeral 1 and this card also has printed upon its face at diagonally opposite corners the same letter, as indicated at 2. The card also has printed upon its face at its other diagonally opposite corners the symbol of that suit as indicated at 3, which in Fig. 1 is a black cross, in Fig. 7 a black flag, etc., throughout the several suits. Another card of each suit has printed upon its face the letter B as indicated by the numeral 4 and this same letter in smaller type at diagonally opposite corners as indicated at 5. Also as in the case of the card bearing the letter A, the card which bears the letter B has printed upon its face at its other diagonally opposite corners the symbol of the suit to which it belongs, as indicated by the numeral 6. Another card of each suit has printed upon its face in large type the letter C as indicated at 7 and in smaller type at diagonally opposite corners the same letter as indicated at 8 and at its other diagonally opposite corners the symbol of that suit as indicated by the numeral 9. Another card of each suit has printed upon its face in large type the letter D as indicated at 10 and in diagonally opposite corners in smaller type the same letter, as indicated at 11, and as in the case of the previously described cards, has also printed upon its face at its other diagonally opposite corners, the symbol of the suit to which it belongs as indicated by the numeral 12. The remaining nine cards of each suit are numbered consecutively in descending order by numerals printed upon their faces at diagonally opposite corners from the numeral 10 to the numeral 2 inclusive, as indicated by the numeral 13.

Figs. 5, 11, 16 and 21 are representative of the said nine remaining cards of each suit and each of these nine remaining cards of each suit has printed upon its face symbols corresponding to the symbol of the suit to which it belongs, the symbols corresponding in number to the numerals at the diagonally opposite corners of the card and which numerals are indicated at 13, the symbols referred to being indicated by the numeral 14 and being preferably arranged in a symmetrical manner.

That card which is shown in Fig. 6 of the drawings has printed upon its face a name which may be the name of the game or any arbitrary name, and which is here shown as Red dot, the words comprising this name being indicated by the numeral 15. This card also has printed upon its face, preferably in black, concentric circles 16 and 17, the circle 17 being located within the circle 16 and the said card also has printed upon its face within the circle 16 and surrounding the circle 17, a circle 18, preferably in red. This card also has printed upon its face within the circle 17 and concentric thereto and preferably in red, a dot.

The cards in each suit range in value in descending order as follows: A, B, C, D, 10, 9, 8, etc., to and including the card numbered 2, and the card shown in Fig. 6 of the drawings has a value less than the "D" card and greater than any of the cards numbered from 10 to 2 inclusive of any of the suits.

The points which may be made in the game intended to be played with the cards embodying the present invention are respectively: "high" which is the "A" card of the trump suit; "low" which is the "2" card of the trump suit; "D" which is the "D" card of the trump suit; "red dot" which is the card shown in Fig. 6 of the drawings, and "game" which is counted by considering the following cards to have the respective values indicated: "A" card;—4: "B" card;—3: "C" card;—2: "D" card;—1: red dot;—1, and "10" card;—10.

While the rules for playing the game may be varied, the suit which is to be the trump suit is determined at the beginning of the game and the trump card of one suit will enable its player to take any card of another suit which is played. Also, in playing the game the card shown in Fig. 6 of the drawings, may be considered by its player to belong to any one of the four suits which is at that time the trump suit.

It will be understood that inasmuch as the card shown in Fig. 6 of the drawings, which card may arbitrarily belong to any of the suits, has its circles and dots printed in different colors as, for example, red and black, the fact that the card may be arbitrarily associated with the cards of a trump suit will be plainly indicated to the players.

Having thus described the invention, what is claimed as new is:

A deck of playing cards comprising four suits of thirteen cards each, the cards of one suit all bearing a representation of a cross in one color, the cards of another suit all bearing the representation of a flag in the same color as the cross, the cards of a third suit all bearing the representation of a star in a different color, and the cards of the fourth suit all bearing a dot in the same color as the star, four of the cards of each suit having printed thereon the first four letters of the alphabet beginning with the letter A at the highest card and of consecutive decreasing value from the first letter and with the remaining cards of each suit designated by numerals decreasing one with each consecutive card and having a value to correspond therewith and the deck including an additional card having an identifying name printed thereon and arbitrarily belonging to any of the suits, the last mentioned card having printed upon its face a plurality of concentric circles corresponding in number and color to the crosses, flags, stars and dots of the different suits.

In testimony whereof I affix my signature.

AVERY B. BAXTER. [L. S.]

Copies of this patent may be obtained for five cents each, by addressing the "Commissioner of Patents, Washington, D. C."